3,642,881
ALKENYL SULFONIC ACIDS

Joseph Rubinfeld, Brooklyn, N.Y., assignor to Colgate-Palmolive Company, New York, N.Y.
No Drawing. Filed Jan. 16, 1967, Ser. No. 609,307
Int. Cl. C07c *143/16*
U.S. Cl. 260—513                 12 Claims

ABSTRACT OF THE DISCLOSURE

Conversion of hydroxyalkane sulfonates to the corresponding alkenyl sulfonates by heating in aqueous acidic medium at pH below 3 and temperature at least about 150° C.

---

This invention relates to the production of alkenyl sulfonic acids.

In accordance with one aspect of this invention, a preformed hydroxyalkane sulfonate is heated in aqueous acidic medium having a pH of less than 3 to a temperature of at least about 150° C. I have found that in this manner the hydroxyalkane sulfonate is quite unexpectedly converted into the more desirable alkenyl sulfonate and that this dehydration reaction takes place despite the presence of a large excess of water in the reaction.

The hydroxyalkane sulfonate used in the process of this invention preferably contains about 8 to 30 carbon atoms and may be obtained readily by the hydrolysis of the corresponding sultones, which may, in turn, be produced by the sulfonation of monoolefins, for example, according to the following scheme:

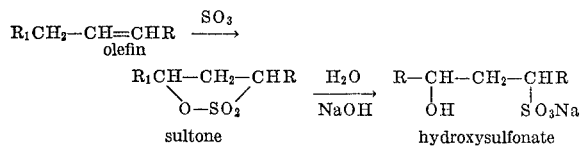

where $R_1$ is an alkyl group and R is alkyl or hydrogen, preferably the lattter. Most preferably, the hydroxy sulfonate contains about 12–20 carbon atoms. In the above equations, the hydroxy group is on the carbon in gamma position relative to the alpha carbon carrying the $SO_3$ group. The treatment of sulfonates in which the hydroxy group is on other carbon atoms (e.g. a beta or delta carbon atom) is also within the scope of this invention.

Other methods of preparing hydroxyalkane sulfonates are by hydrolysis of acetoxy alkane sulfonic acids.

The hydroxyalkane sulfonate may be furnished in its salt form, e.g. as a salt of an alkali metal (such as Na or K), in which case it is converted to a mixture, the acid and the corresponding salt (e.g. sodium sulfate) on admixture with the highly acidic aqueous medium, or it may be furnished in the preformed acid form.

The hydroxyalkane sulfonate used in the reaction may be supplied in admixture with other materials, such as the corresponding alkenyl sulfonate. Such mixtures may be formed by the known process of sulfonating an olefin (which may be of the type described above) using a mole ratio of $SO_3$ to olefin of about 1:1 or higher, followed by hot alkaline treatment of the resulting acid mix (containing sultone and alkenyl sulfonic acid), all as disclosed, for example, in British Pats. 983,056 and 1,030,648 which also list suitable olefins.

In the preferred treatment of the hydroxyalkane sulfonate in aqueous acidic medium, the pressure is sufficient to maintain a liquid aqueous reaction mixture and the ratio of the amount of liquid water present in the reaction mixture to the amount of hydroxyalkane sulfonate is at least about 1:4, preferably at least about 1:1. The reaction temperature is preferably in the range of about 160 to 250° C. and the time of reaction, which will depend on the specific temperature used, will generally be above one minute, more usually in the range of about 5 minutes to one hour.

The pH of the reaction mixture is preferably not above about 2, e.g. in the range of about 1 to 2, and is preferably obtained by mixing aqueous sulfuric acid with the hydroxy sulfonate. The water:$H_2SO_4$ ratio is generally well above 1:1.

Typically, the reaction mixture is initially milky; on heating, it foams and after a short time the foam collapses and the mixture clears, indicating that reaction has taken place to substantial extent.

The following examples are given to illustrate this invention further:

EXAMPLE 1

2.5 grams of hydroxyoctadecane sulfonate (made by treating a C18 gamma sultone with aqueous alkali), having a bromine number of zero, were mixed with 20 cc. of water and one gram of 98% sulfuric acid. The mixture was heated in a glass bomb tube under autogenous pressure for 15 minutes at 200° C., then brought to a pH of about 11–13 by mixing with a 50% aqueous solution of NaOH. At room temperature, acetone was added, with stirring, until a precipitate began to form; the mixture was then cooled to 0° C. and more precipitate formed. The precipitate was recrystallized from anhydrous ethanol to produce 2.3 grams of a material which had a bromine number of 19.8 and a content of anionically active detergent of about 80% (as determined by conventional titration with a cationic agent).

EXAMPLE 2

Example 1 was repeated except that the amount of $H_2SO_4$ was double and the solution, after the addition of the aqueous base, was further diluted to 500 cc. with a 50/50 ethanol/water mixture and then rolled dried, to produce 4.7 grams of a material which had a bromine number of 15.7 and contained 43.8% of anionically active detergent; thus, the bromine number of the total active ingredient was about 35.8 which is about 80% of that of a pure alkenyl sulfonate, and the recovered yield of active ingredient was about 86% of theoretical.

EXAMPLE 3

2.0 grams of the hydroxyalkane sulfonate of Example 1 were mixed with only one gram of the 98% $H_2SO_4$ and 5 cc. of water and heated in the bomb tube under autogenous pressure for ½ hour at 200° C., and then mixed with alkali, as in Example 1, to produce 2.06 grams of a material which had a 82.3% content of anionically active detergent. The bromine number of the organic alcohol-soluble portion was about 32.3.

EXAMPLE 4

Example 3 was repeated but the amount of water was increased to 10 cc. (rather than 5 cc.) and the heat-treating time was increased to 2 hours, to produce 2.1 grams of material which had a 78% content of anionically active detergent and a bromine number of 30.1 (38.6 on an active ingredient basis).

EXAMPLE 5

(a) An aqueous slurry on an olefin sulfonate detergent containing sodium alkenyl sulfonates and sodium hydroxyalkane sulfonates was produced by treating hexadecene-1 with highly diluted gaseous $SO_3$ in about 1:1 mole ratio followed by treatment of the resulting acid mix with aqueous sodium hydroxide (in molar amount in excess of the amount of $SO_3$ used, e.g. 10–30% excess) while heating, all in known manner. The content of anionically active surface active agent in the slurry was 31%, and the bromine number of the surface active agent was about 28.2, showing that an appreciable proportion of the C16 sulfonate was saturated (e.g. present as hydroxalkane sulfonate and, probably, in much smaller proportion, as a disulfonated product).

To 16.5 parts of the slurry there were added 5 parts of water and the pH was then adjusted to about 1 by the addition of 2 parts of 98% $H_2SO_4$. The resulting mixture was heated in a sealed glass vessel, under autogenous pressure, at 200° C. for one hour. It was then made basic, with aqueous caustic soda, and roll dried at a temperature of about 135° C. The dried product was then treated to remove inorganic salts by dissolving it in hot ethanol, filtering off the undissolved salts, concentrating the filtrate by evaporation and cooling. There were recovered 4.6 parts of a material having an anionically active detergent concentration of 94% and a bromine number of 40; the bromine number of the active olefin sulfonate material was therefore 42.6 (i.e. 0.94/40) showing that it had a very high content of alkenyl sulfonate.

(b) When Example 5(a) wa srepeated using a temperature of 150° C. and a period of ½ hour for the heat treatment of the acidified slurry, the product had a 93.9% concentration of anionically active material and a bromine number of 32.4 (as compared to 40).

(c) When Example 5(b) was repeated using only 1 part of the 98% $H_2SO_4$ so that the pH after this acid addition was only 10.3, the product had a 95.8% concentration of anionically active material and a bromine number of 26.4; the bromine number of the active material was therefore only about 27.5.

In this description and claims, all proportions are by weight unless otherwise indicated. In the foregoing examples, the pressures were atmospheric unless otherwise stated.

Although the present invention has been described with reference to particular embodiments and examples, it will be apparent to those skilled in the art that variations and modifications can be substituted therefor without departing from the principles and true spirit of the invention. The "Abstract" given above is for the convenience of technical searchers and is not to be used for interpreting the scope of the invention or claims.

I claim:

1. Process for the production of alkenyl sulfonic acids which comprises forming a mixture of hydroxyalkanesulfonic acid and aqueous medium containing sulfuric acid, said mixture having a pH below about 3, by mixing sulfuric acid with a preformed hydroxalkane sulfonic compound, said compound being a preformed hydroxyalkane sulfonic acid or an alkali metal hydroxyalkanesulfonate which is converted to said hydroxyalkane sulfonic acid on said mixing with said sulfuric acid, and heating said mixture having a pH below 3 at a temperature of about 150° C. to 250° C. to convert said hydroxyalkane sulfonic acid to the corresponding alkenyl sulfonic acid the amount of water in said aqueous medium being at less ¼ the amount of hydroxyalkane sulfonic acid.

2. Process as in claim 1 in which said sulfonic acids have terminal —$SO_3H$ groups and about 8 to 30 carbon atoms.

3. Process as in claim 2 in which the aqueous medium contains sulfuric acid in amount sufficient to bring the pH to at most about 2.

4. Process as in claim 2 in which the pH is at most about 2, said aqueous medium contains sulfuric acid, the amount of liquid water in the aqueous medium is at least about equal to the amount of said hydroxyalkanesulfonic acid, and the temperature is in the range of about 160–250° C., said medium being maintained under superatmospheric pressure whereby the reactants are in liquid phase.

5. Process as in claim 4 in which said hydroxyalkanesulfonic acid is supplied by mixing an alkali metal hydroxyalkanesulfonate with sulfuric acid.

6. Process as in claim 4 in which the hydroxyalkanesulfonic acid is present in admixture with alkenyl sulfonic acid.

7. Process as in claim 4 and including the preliminary steps of heat-treating a sultone of about 8 to 30 carbon atoms in aqueous alkaline medium to produce an aqueous dispersion of a hydroxyalkane sulfonate salt, and acidifying said dispersion with sulfuric acid.

8. Process as in claim 6 including the preliminary steps of reacting an alpha-olefin of 8 to 30 carbon atoms with gaseous diluted $SO_3$ to produce an acid mix containing a gamma sultone and an alkenyl sulfonic acid, mixing said acid mix with aqueous alkali and heat treating the resulting mixture under alkaline conditions to produce an aqueous dispersion of a blend of hydroxyalkane sulfonate and alkenyl sulfonate, and acidifying said dispersion with sulfuric acid.

9. Process as in claim 8 in which said aqueous alkali is aqueous sodium hydroxide and in which the product of said acidic heat treatment is thereafter neutralized with aqueous sodium hydroxide to produce a detergent having a high content of sodium alkenyl sulfonate.

10. Process as in claim 5 in which the hydroxyalkanesulfonic acid is present in an aqueous mixture produced by heat-treating a sultone of about 8 to 30 carbon atoms in aqueous alkaline medium to produce an aqueous dispersion of a hydroxyalkane sulfonate salt, and acidifying said dispersion with sulfuric acid.

11. Process as in claim 5 in which the hydroxyalkanesulfonic acid is present in an aqueous mixture produced by the steps of reacting an alpha-olefin of 8 to 30 carbon atoms which gaseous diluted $SO_3$ to produce an acid mix containing a gamma sultone and an alkenyl sulfonic acid, mixing said acid mix with aqueous alkali and heat treating the resulting mixture under alkaline conditions to produce an aqueous dispersion of a blend of hydroxyalkane sulfonate and alkenyl sulfonate, and acidifying said dispersion with sulfuric acid.

12. Process as in claim 11 in which the alkenyl sulfonic acid product is thereafter neutralized with aqueous sodium hydroxide to produce a detergent having a high content of sodium alkenyl sulfonate, and in which, in the production of said aqueous hydroxyalkanesulfonic acid, said aqueous alkali is aqueous sodium hydroxide.

References Cited

UNITED STATES PATENTS

| 3,409,637 | 11/1968 | Eccles et al. | 260—504 |

FOREIGN PATENTS

| 1,214,671 | 4/1966 | Germany | 260—513 |
| 1,044,691 | 10/1966 | Great Britain | 260—513 |
| 1,215,695 | 5/1966 | Germany | 260—513 |

DANIEL D. HORWITZ, Primary Examiner